(12) United States Patent
Chueh et al.

(10) Patent No.: US 9,760,139 B2
(45) Date of Patent: Sep. 12, 2017

(54) METHOD AND SYSTEM FOR POWER SUPPLY UNIT CURRENT SHARING

(71) Applicant: Dell Products, L.P., Round Rock, TX (US)

(72) Inventors: Yung Fa Chueh, New Taipei (TW); Tsai-Fu Hung, Hsin-Dian (TW); Chung-Fu Lai, Sanchong (TW); Shih-Chieh Wang, Taipei (TW)

(73) Assignee: DELL PRODUCTS, L.P., Round Rock, TX (US)

( * ) Notice: Subject to any disclaimer, the term of this patent is extended or adjusted under 35 U.S.C. 154(b) by 70 days.

(21) Appl. No.: 14/677,882

(22) Filed: Apr. 2, 2015

(65) Prior Publication Data

US 2016/0291660 A1 Oct. 6, 2016

(51) Int. Cl.
*G06F 1/26* (2006.01)
*H02M 1/00* (2006.01)
*G06F 11/30* (2006.01)

(52) U.S. Cl.
CPC .............. *G06F 1/263* (2013.01); *G06F 1/26* (2013.01); *G06F 11/3058* (2013.01); *H02M 2001/0032* (2013.01); *H02M 2001/0045* (2013.01)

(58) Field of Classification Search
CPC .... G06F 1/263; G06F 1/3203; G06F 11/3058; G06F 11/3062; G06F 1/189; H01M 10/44; H02M 2001/0032; H02M 2001/0045
USPC ........................................................ 323/283
See application file for complete search history.

(56) References Cited

U.S. PATENT DOCUMENTS

| | | | | |
|---|---|---|---|---|
| 6,958,552 B2 * | 10/2005 | Dodson, III | ............ | H02J 1/108 307/52 |
| 8,084,885 B1 * | 12/2011 | Zansky | ..................... | H02J 1/10 307/60 |
| 8,120,205 B2 * | 2/2012 | Heineman | ................. | G06F 1/26 307/52 |
| 8,325,504 B2 * | 12/2012 | Kammeter | ............. | H02J 1/102 307/151 |
| 8,929,106 B2 * | 1/2015 | Reddy | ............................. | 363/49 |
| 9,178,433 B2 * | 11/2015 | Jutras | ........................ | G06F 1/26 |
| 9,214,866 B2 * | 12/2015 | Nora | .................... | H02M 3/1584 |
| 2013/0002212 A1 * | 1/2013 | Fan | ..................... | H02M 3/1588 323/235 |

(Continued)

*Primary Examiner* — Fred E Finch, III
*Assistant Examiner* — Demetries A Gibson
(74) *Attorney, Agent, or Firm* — Norton Rose Fulbright US LLP

(57) ABSTRACT

Methods and systems for power supply unit (PSU) current sharing may include an In-System Power Monitoring and Management (IPMM) module monitoring an output value of a first power supply unit in a multi-power supply system. In an embodiment, the IPMM module may monitor an output value of a second power supply unit in the multi-power supply system. Additionally, the IPMM module may monitor an output performance parameter for the multi-power supply system. Furthermore, the IPMM module may adjust a setting of at least one of the first power supply unit and the second power supply unit for optimization of a current sharing performance parameter of the multi-power supply system. In various embodiments, the setting may include a droop voltage value, a distribution impedance value, or a set voltage increment value of at least one of the first power supply unit and the second power supply unit.

20 Claims, 6 Drawing Sheets

(56) References Cited

U.S. PATENT DOCUMENTS

| | | | | |
|---|---|---|---|---|
| 2013/0162042 A1* | 6/2013 | Phadke | ............... | H02J 3/26 |
| | | | | 307/43 |
| 2013/0300392 A1* | 11/2013 | Laur | ............... | H02M 3/156 |
| | | | | 323/284 |
| 2013/0314959 A1* | 11/2013 | Hu | ............... | H02M 7/02 |
| | | | | 363/84 |
| 2014/0266141 A1* | 9/2014 | Isham | ............... | H02M 3/157 |
| | | | | 323/318 |
| 2015/0076910 A1* | 3/2015 | Wang | ............... | H02J 1/04 |
| | | | | 307/52 |
| 2015/0222183 A1* | 8/2015 | Karlsson | ............... | H02M 3/156 |
| | | | | 323/271 |
| 2015/0333519 A1* | 11/2015 | Shiota | ............... | H02J 3/46 |
| | | | | 307/44 |

* cited by examiner

| Distribution-R | | $V_{droop}$ (V) | Set Vo Tolerance | | Estimate CSE of FullLoad (%) | Remark |
|---|---|---|---|---|---|---|
| R1(Ω) | R2(Ω) | | V1(V) | V2(V) | | |
| 100u | 100u | 300mV | 12.320 | 12.380 | ±9.6 | Industry Vo±30mV & 300mV$_{droop}$ |
| 100u | 100u | 300mV | 12.335 | 12.365 | ±4.8 | Expect DSP design of Vo±15mV |
| 100u | 100u | 400mV | 12.335 | 12.365 | ±3.7 | Enlarge V$_{droop}$ |
| 100u | 100u | 700mV | 12.335 | 12.365 | ±2.2 | |
| 100u | 100u | 800mV | 12.335 | 12.365 | ±1.8 | |
| 500u | 500u | 700mV | 12.335 | 12.365 | ±2.0 | Moving resistance of Or'ing devices out of PSU loop for better CS performance |
| 500u | 800u | 500mV | 12.335 | 12.365 | ±1.3 | |
| 500u | 1m | 500mV | 12.335 | 12.365 | ±0.42 | Lower voltage PSU with higher impedance has worse sharing performance |
| 1m | 500u | 500mV | 12.335 | 12.365 | ±5.8 | |
| 100u | 100u | 400mV | 12.335 | 12.365 | ±3.6 | Load<50% |
| 100u | 100u | 800mV | 12.335 | 12.365 | ±1.15 | Load>50% |

FIG. 4

METHOD AND SYSTEM FOR POWER SUPPLY UNIT CURRENT SHARING

FIELD

This disclosure relates generally to information handling systems, and more specifically, to a method and system for power supply unit current sharing.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically include multiple or redundant power supply units (e.g., as a failsafe for power system malfunction). Power supply units may perform a variety of functions, such as, but not limited to, power conversion, alternating current to direct current (AC-DC) or DC-DC conversion, adjusting voltage levels, and/or providing backup power during power grid outages. In multi-power supply systems it is typically desirable to evenly load each power supply unit so that each of the multiple power supply units experiences a similar amount of wear and thereby has a similar lifetime to the other power supply units in the system, however shared power supply units do not typically communicate with one another so passive and/or active current sharing schemes may be utilized to promote load leveling. Conventional passive current sharing schemes require one power supply unit to exceed a 100% load rating in redundant applications since passive current sharing systems usually have a high current sharing error (e.g., plus or minus 10% for droop method, or much more error for only sharing with OR'ing devices). Furthermore, different current sharing motherboard platforms may utilize inconsistent distribution impedances, which makes use across a portfolio of applications problematic. Conventional active current sharing schemes require complex and expensive feedback circuitry.

SUMMARY

Methods and systems for power supply unit (PSU) current sharing are described. In an embodiment, a method may include an In-System Power Monitoring and Management (IPMM) module monitoring an output value of a first power supply unit in a multi-power supply system. The method may also include the IPMM module monitoring an output value of a second power supply unit in the multi-power supply system. Additionally, the method may include determining, with the IPMM module, an output performance parameter for the multi-power supply system. Furthermore, the method may include the IPMM module adjusting a setting of at least one of the first power supply unit and the second power supply unit for optimization of a current sharing performance parameter of the multi-power supply system.

In one embodiment, the output performance parameter may include a current sharing value. In an embodiment, the output performance parameter may include a current sharing error margin of a full power load. In a further embodiment, the setting may include a distribution impedance value of at least one of the first power supply unit and the second power supply unit. The setting may include a droop voltage value. Similarly, the setting may include a set voltage increment value of at least one of the first power supply unit and the second power supply unit.

In an embodiment, a system for PSU current sharing are described may include a first power supply unit in a multi-power supply system. Additionally, the system may include a second power supply unit in the multi-power supply system. Furthermore, the system may include an IPMM module configured to monitor an output value of the first power supply unit. In one embodiment, the IPMM module may be configured to monitor an output value of the second power supply unit. Additionally, the IPMM module may be configured to determine an output performance parameter for the multi-power supply system. In some embodiments, the IPMM module may be configured to adjust a setting of at least one of the first power supply unit and the second power supply unit for optimization of a current sharing performance parameter of the multi-power supply system.

In one embodiment, an apparatus for PSU current sharing are described may include a first power supply unit in a multi-power supply system. Additionally, the apparatus may include a second power supply unit in the multi-power supply system. Furthermore, the apparatus may include an IPMM module configured to monitor an output value of the first power supply unit. In an embodiment, the IPMM module may be configured to monitor an output value of the second power supply unit. Additionally, the IPMM module may be configured to determine an output performance parameter for the multi-power supply system. In some embodiments, the IPMM module may be configured to adjust a setting of at least one of the first power supply unit and the second power supply unit for optimization of a current sharing performance parameter of the multi-power supply system.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 4 is a schematic table illustrating one embodiment of an apparatus for PSU current sharing.

DETAILED DESCRIPTION

Embodiments of methods and systems for power supply unit (PSU) current sharing are described. In an embodiment, an In-System Power Monitoring and Management (IPMM) module monitors the output current of each PSU in a multi-PSU system and selectively alters PSU performance by adjusting one or more output values of a PSU.

In various embodiments, a PSU current sharing method may be implemented in firmware or hardware to selectively adjust the output voltage, distribution impedance (i.e., resistance), droop voltage, and/or set voltage tolerance values. The adjusted values may be controlled via register values of an IPMM system coupled to shared power supplies. The IPMM registers thus support current sharing adjustments in a multi-PSU system. In an embodiment a control circuit may include transistor-based OR'ing configured to adjust distribution resistance. In an embodiment a control circuit may adjust an output voltage. In one embodiment, the system may include a current amplifier coupled to a control circuit configured to introduce and/or adjust droop voltage to a direct current to direct current (DC/DC) converter and/or transformer unit of a power supply system.

Higher droop voltages enable improved current sharing accuracy. Since droop voltage uses the nature of the power supply circuit (i.e., voltage decreases as output current increases), the IPMM system requires less complex circuitry to accurately adjust system performance attributes, such as droop voltage, output voltage increment values, and distribution resistance, relative to conventional active current sharing systems. Controlling droop voltage may improve the current sharing error (CSE) to the range of less than plus or minus 2%. An IPMM register-based current sharing adjustment system may be flexible enough to be standardized across multiple PSU platforms and also enables system performance options to be assigned by an engineer during the development stage per different platform/motherboard impedance parameters in a cost effective manner.

Figure 1:
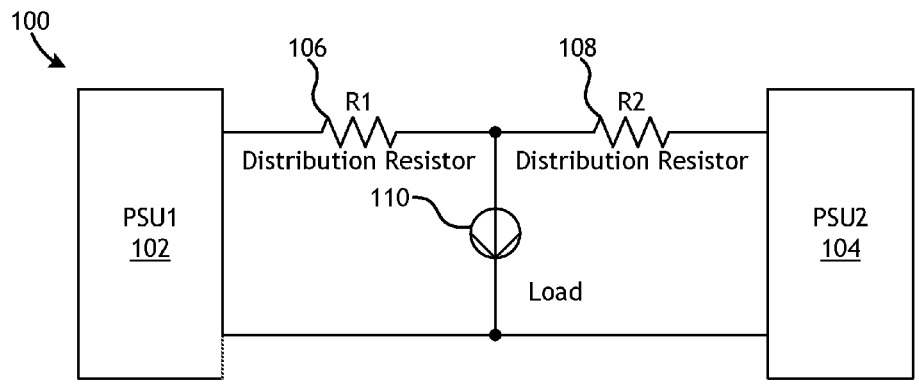
FIG. 1 is a schematic block diagram illustrating one embodiment of a system for power supply unit (PSU) current sharing.

FIG. 1 is a schematic circuit diagram illustrating one embodiment of a system 100 for PSU current sharing. In an embodiment, system 100 may include a first PSU 102, a second PSU 104, a first distribution resistor 106, a second distribution resistor 108, and a load 110. In one embodiment a first terminal of the first distribution resistor 106 may be coupled to the first power supply unit 102, and a second terminal of the first distribution resistor 106 may be coupled to load 110 and a second terminal of the second distribution resistor 108. Similarly, a first terminal of the second distribution resistor 108 may be coupled to second PSU 104, and a the second terminal of second distribution resistor 108 may be coupled to load 110 and the second terminal of first distribution resistor 106. As depicted, a second terminal of load 110 may be coupled to both first PSU 102 and second PSU 104. In one embodiment, the second terminal of load 110 may be grounded.

Figure 2:
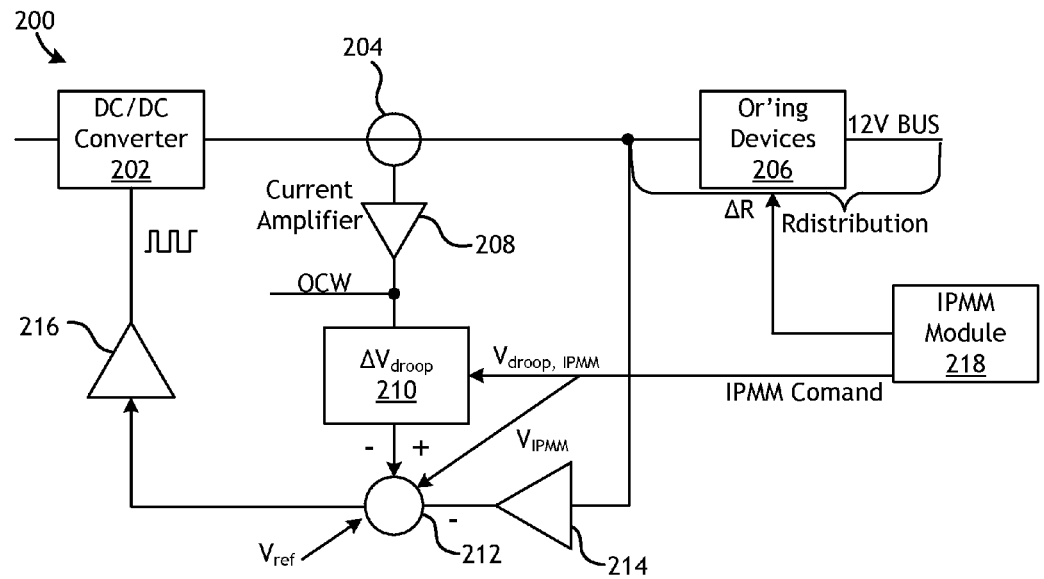
FIG. 2 is a schematic block diagram illustrating one embodiment of a system for PSU current sharing.

FIG. 2 is a schematic circuit diagram illustrating one embodiment of a system 200 for PSU current sharing. In an embodiment, system 200 may include a direct current to direct current (DC/DC) converter 202 (e.g., a transformer circuit or the like) coupled to a sense current terminal 204. The sense current terminal 204 may also be coupled to one or more transistor-based (e.g., field effect transistor (FET)) OR'ing devices 206, which may in turn be coupled to an output terminal. In an embodiment, OR'ing devices 206 may be configured to provide a distribution resistance (e.g., "Rdistribution" in FIG. 1) to an output terminal (e.g., a 12 Volt bus terminal) of system 200. In one embodiment, the current sense terminal 204 may be coupled to a current amplifier 208 and a voltage amplifier network 214. The current amplifier 208 may be configured to amplify a current for an Over Current Warning (OCW) terminal. In an embodiment, the current amplifier 208 may be coupled to a droop voltage adjustment module 210 (e.g., a "ΔV_droop" voltage adjustment circuit), which may in turn be coupled to a voltage mixer terminal 212. The voltage mixer terminal 212 may be coupled to an output of voltage amplifier network 214 and also coupled to an input of error amplifier 216. The output of error amplifier 216 may be coupled to DC/DC converter 202, thereby completing a feedback loop of system 200.

In one embodiment, system 200 may include an IPMM module 218. In various embodiments, IPMM module 218 may be implemented via hardware (HW), firmware (FW), software (SW), or a combination thereof. Additionally, IPMM module 218 may be configured to perform various functions illustrated in FIG. 4, FIG. 5, FIG. 6, and/or FIG. 7. In an embodiment, IPMM module 218 may be coupled to OR'ing devices 206, droop voltage adjustment module 210, voltage mixer terminal 212, and/or the OCW terminal via one or more registers, FW, and/or HW circuitry. In one embodiment, IPMM module 218 may include one or more registers configured to store one or more setting values corresponding to output performance parameters of power supplies in a multi-power supply system. For example, IPMM module 218 may be configured to store a droop voltage setting value for droop voltage adjustment module 210, a distribution impedance (i.e., resistance) setting value for OR'ing devices 206 (e.g., a 500 µΩ resistance setting value or the like), a set voltage increment setting value for voltage mixer 212, a reference voltage setting value for voltage mixer terminal 212, one or more current amplifier control setting values, and/or a CSE setting value corresponding to a current sharing error margin of a full power load.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 3:
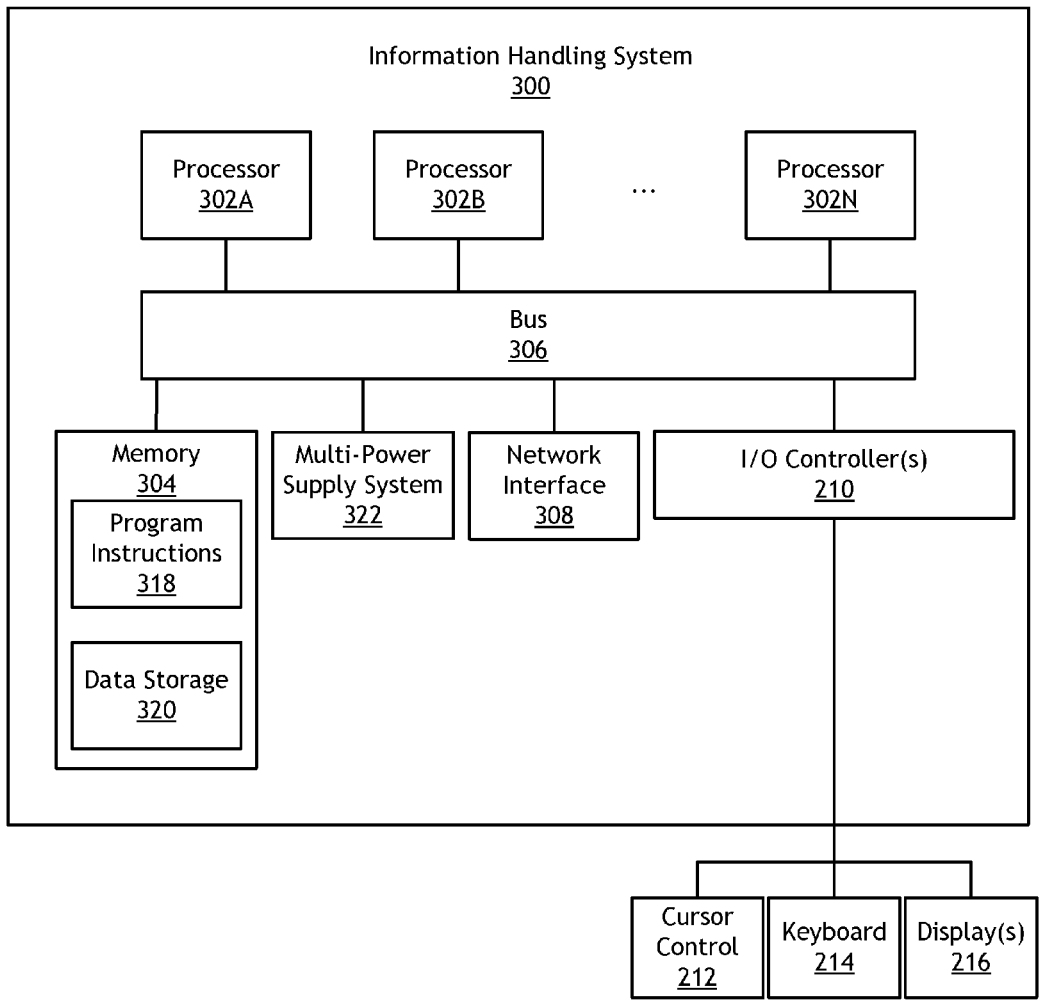
FIG. 3 is a schematic block diagram illustrating one embodiment of an Information Handling System (IHS) configured for PSU current sharing.

FIG. 3 is a schematic block diagram illustrating one embodiment of an IHS 300 configurable for PSU current sharing. In one embodiment, system 100 and/or system 200 of FIG. 1 and FIG. 2, respectively, may be implemented on an information handling system similar to IHS 300 described in FIG. 3. Similarly, IPMM module 218 may be implemented on an information handling system similar to IHS 300 described in FIG. 3. In various embodiments, IHS 300 may be a server, a mainframe computer system, a workstation, a network computer, a desktop computer, a laptop, or the like.

As illustrated, IHS 300 includes one or more processors 302A-N coupled to a system memory 304 via bus 306. IHS 300 further includes network interface 308 coupled to bus 306, and input/output (I/O) controller(s) 310, coupled to devices such as cursor control device 312, keyboard 314, and display(s) 316. In some embodiments, a given entity (e.g., system 100 or system 200) may be implemented using a single instance of IHS 300, while in other embodiments multiple such information handling systems, or multiple nodes making up IHS 300, may be configured to host different portions or instances of embodiments (e.g., IPMM module 218). In one embodiment IHS 300 may include a multi-power supply system 322 coupled to bus 306. Multi-power supply system 322 may perform functions of embodiments illustrated in FIG. 1, FIG. 2, FIG. 4, FIG. 5, FIG. 6, and/or FIG. 7.

In various embodiments, IHS 300 may be a single-processor information handling system including one processor 302A, or a multi-processor information handling system including two or more processors 302A-N (e.g., two, four, eight, or another suitable number). Processor(s) 302A-N may be any processor capable of executing program instructions. For example, in various embodiments, processor(s) 302A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 302A-N may commonly, but not necessarily, implement the same ISA. Also, in some embodiments, at least one processor(s) 302A-N may be a graphics processing unit (GPU) or other dedicated graphics-rendering device.

System memory 304 may be configured to store program instructions and/or data accessible by processor(s) 302A-N. For example, memory 304 may be used to store a software program and/or database shown in FIG. 2, FIG. 4, FIG. 5, FIG. 6, and FIG. 7. In various embodiments, system memory 304 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described above, may be stored within system memory 304 as program instructions 318 and data storage 320, respectively. In other embodiments, program instructions and/or data may be received, sent or stored upon different types of IHS-accessible media or on similar media separate from system memory 304 or IHS 300. Generally speaking, a IHS-accessible medium may include any tangible, non-transitory storage media or memory media such as electronic, magnetic, or optical media-e.g., disk or CD/DVD-ROM coupled to IHS 300 via bus 306, or non-volatile memory storage (e.g., "flash" memory)

The terms "tangible" and "non-transitory," as used herein, are intended to describe an IHS-readable storage medium (or "memory") excluding propagating electromagnetic signals, but are not intended to otherwise limit the type of physical IHS-readable storage device that is encompassed by the phrase IHS-readable medium or memory. For instance, the terms "non-transitory IHS readable medium" or "tangible memory" are intended to encompass types of storage devices that do not necessarily store information permanently, including for example, random access memory (RAM). Program instructions and data stored on a tangible IHS-accessible storage medium in non-transitory form may further be transmitted by transmission media or signals such as electrical, electromagnetic, or digital signals, which may be conveyed via a communication medium such as a network and/or a wireless link.

In an embodiment, bus 306 may be configured to coordinate I/O traffic between processor 302, system memory 304, and any peripheral devices including network interface 308 or other peripheral interfaces, connected via I/O controller(s) 310. In some embodiments, bus 306 may perform any necessary protocol, timing or other data transformations to convert data signals from one component (e.g., system memory 304) into a format suitable for use by another component (e.g., processor(s) 302A-N). In some embodiments, bus 306 may include support for devices attached through various types of peripheral buses, such as a variant of the Peripheral Component Interconnect (PCI) bus standard or the Universal Serial Bus (USB) standard, for example. In some embodiments, the operations of bus 306 may be split into two or more separate components, such as a north bridge and a south bridge, for example. In addition, in some embodiments some or all of the operations of bus 306, such as an interface to system memory 304, may be incorporated directly into processor(s) 302A-N.

Network interface 308 may be configured to allow data to be exchanged between IHS 300 and other devices, such as other information handling systems attached to power supply units 306A-N, for example. In various embodiments, network interface 308 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

I/O controller(s) 310 may, in some embodiments, enable connection to one or more display terminals, keyboards, keypads, touch screens, scanning devices, voice or optical recognition devices, or any other devices suitable for entering or retrieving data by one or more IHS 300. Multiple input/output devices may be present in IHS 300 or may be distributed on various nodes of IHS 300. In some embodiments, similar I/O devices may be separate from IHS 300 and may interact with IHS 300 through a wired or wireless connection, such as over network interface 308.

As shown in FIG. 3, memory 304 may include program instructions 318, configured to implement certain embodiments described herein, and data storage 320, comprising various data accessible by program instructions 318. In an embodiment, program instructions 318 may include software elements of embodiments illustrated in FIG. 2, FIG. 4, FIG. 5, FIG. 6, and/or FIG. 7. For example, program instructions 318 may be implemented in various embodiments using any desired programming language, scripting language, or combination of programming languages and/or scripting languages. Data storage 320 may include data that may be used in these embodiments such as, for example, firmware 308A-N. In other embodiments, other or different software elements and data may be included.

A person of ordinary skill in the art will appreciate that IHS 300 is merely illustrative and is not intended to limit the scope of the disclosure described herein. In particular, the information handling system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other information handling system configurations.

Embodiments of system 100 and system 200 described in FIG. 1, FIG. 2, FIG. 4, FIG. 5, FIG. 6, and FIG. 7 may be implemented in an information handling system that is similar to IHS 300. In one embodiment, the elements described in FIG. 1, FIG. 2, FIG. 4, FIG. 5, FIG. 6, and/or FIG. 7 may be implemented in discrete hardware modules. Alternatively, the elements may be implemented in software-defined modules which are executable by one or more of processors 302A-N, for example.

FIG. 4 is a schematic table 400 illustrating one embodiment of an apparatus for PSU current sharing. As depicted, table 400 includes multiple distribution resistance (i.e., Rdistribution) values, droop voltage values (i.e., Vdroop), set voltage increment values (i.e., set Vout), and several plus or minus percentage values of the corresponding CSE (current sharing error) margin of a full power load. In an embodiment, table 400 indicates that it is possible for system 200 of FIG. 2 to achieve a plus or minus 2% CSE via the control of droop voltage, distribution resistance, and/or set voltage increment values by an IPMM module, such as IPMM module 218. Table 400 thus illustrates that adjustments to one or more settings (e.g., droop voltage, distribution resistance, set output voltage increment values, or the like) may impact an output performance parameter, such as a current sharing performance parameter, of a power supply in a multi-power supply system, thereby enabling efficient and accurate current sharing without the need for one power supply to exceed 100% loading.

Figure 5:
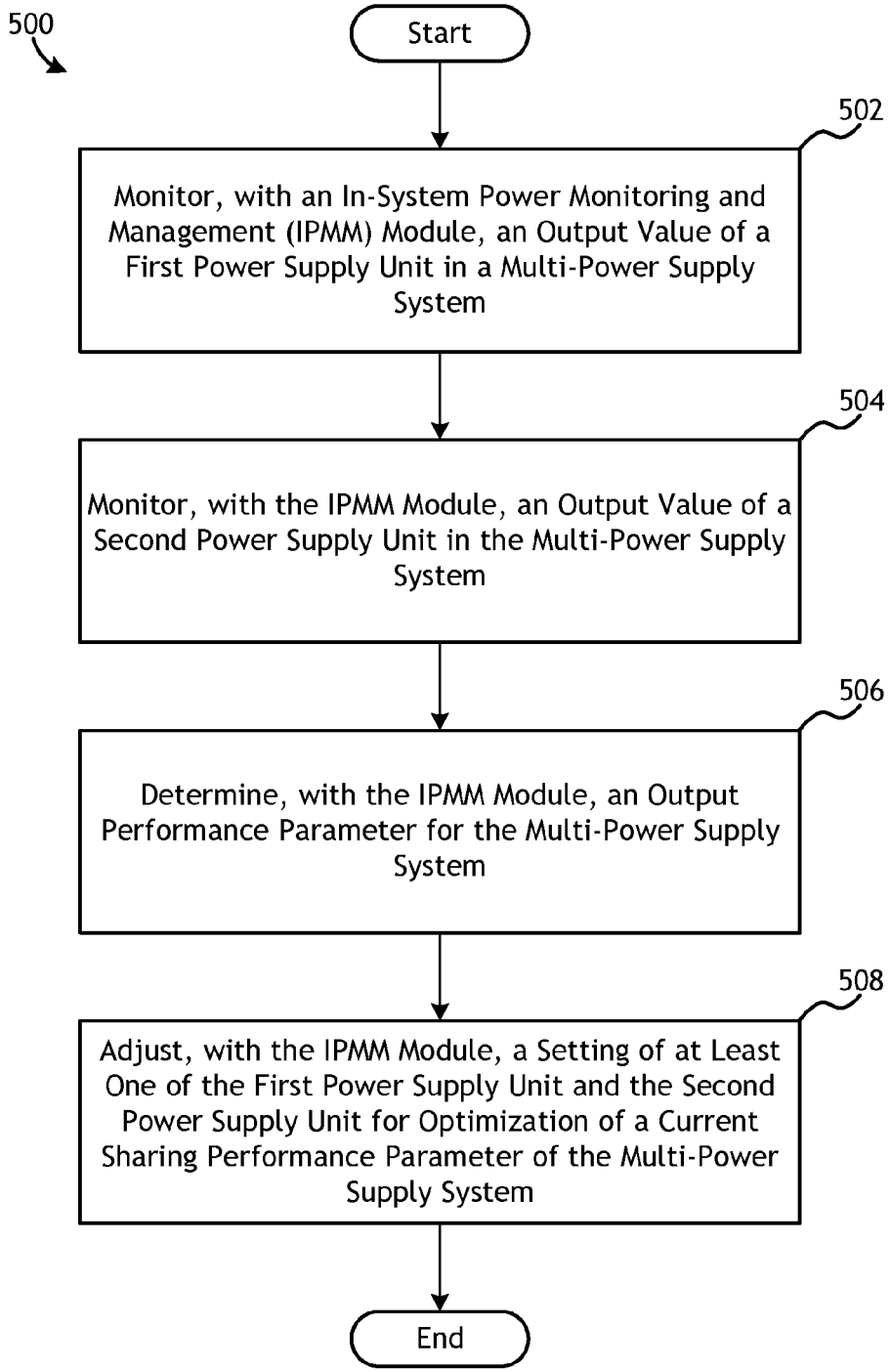
FIG. 5 is a schematic flowchart diagram illustrating one embodiment of a method for PSU current sharing.

FIG. 5 is a schematic flowchart diagram illustrating one embodiment of a method 500 for PSU current sharing. At block 502, the method 500 includes monitoring, with an IPMM module (e.g., IPMM module 218 of FIG. 2), an output value of a first power supply unit (e.g., first PSU 102 of FIG. 1) in a multi-power supply system. As depicted in block 504, the method 500 includes monitoring, with the IPMM module, an output value of a second power supply unit (e.g., second PSU 104 of FIG. 1) in the multi-power supply system. As shown in block 506, the method 500 includes determining, with the IPMM module an output performance parameter for the multi-power supply system. As depicted in block 508, the method 500 includes adjusting, with the IPMM module, a setting of at least one of the first power supply unit and the second power supply unit for optimization of a current sharing performance parameter of the multi-power supply system. In various embodiments, the output performance parameter may be a current sharing value and/or a current sharing error margin of a full power load. Similarly, the setting may be a droop voltage value, a distribution impedance value of at least one of the first power supply unit and the second power supply unit, and/or a set output voltage increment value of at least one of the first power supply unit and the second power supply unit.

Figure 6:
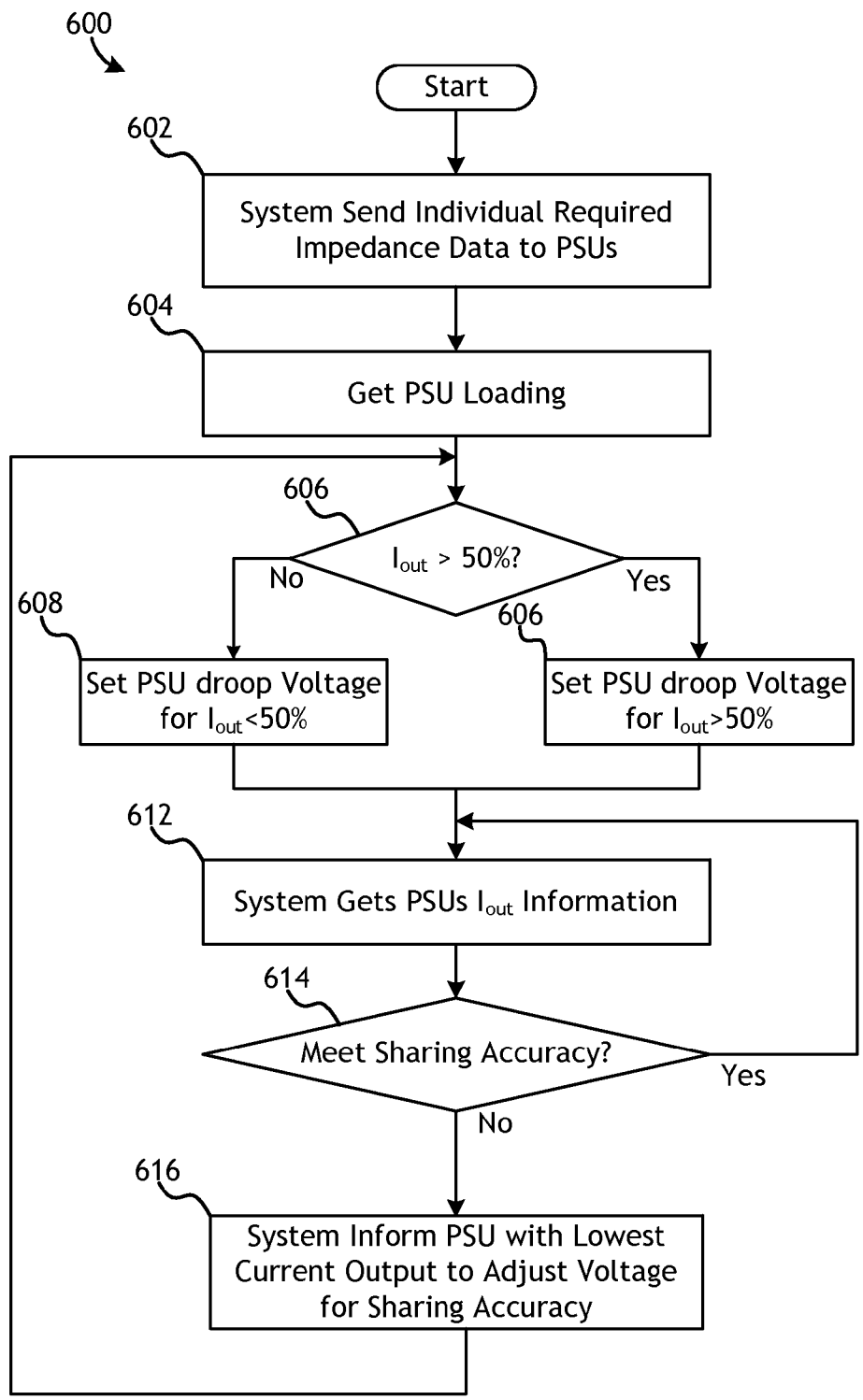
FIG. 6 is a schematic flowchart diagram illustrating one embodiment of a method for PSU current sharing.

FIG. 6 is a schematic flowchart diagram illustrating one embodiment of a method 600 for PSU current sharing. At block 602, the method 600 includes a module, such as IPMM module 218 of FIG. 2, sending individual required impedance data to PSUs in a multi-power supply system. In one embodiment, the distribution resistance may be based on an input into the system through IPMM register5. Each PSU may receive individual data via the IPMM module for adjustment. As depicted in block 604, the IPMM module determines the loading of one or more PSUs. As shown in block 606, the IPMM module determines whether the output current is greater than 50% of a full system loading. In various embodiments, the current monitoring may be performed by a system module, such as an IPMM module, and/or by individual current monitoring circuit modules within each PSU. If the output current is not greater than 50% then the IPMM module sets a PSU droop voltage value corresponding to an output current value of between 0% and 50% (e.g., by adjusting the droop voltage setting value in register3 to 400 mV), as shown in block 608. If the output current is greater than 50%, then the IPMM module sets a PSU droop voltage value corresponding to an output current value of between 50% and 100% (e.g., by adjusting the droop voltage setting value in register4 to 800 mV), as depicted in block 610. In an embodiment, more than 2 droop voltage values (i.e., additional voltages other than 400 mV or 800 mV) may be utilized by the IPMM module to control droop voltage levels.

As shown in block 612, the IPMM module determines the output current information (i.e., the current value of Iout) of a PSU. In an embodiment, each PSU may report output current information to a system module, such as an IPMM module, via an IPMM register value. As depicted in block 614, the IPMM module determines whether the output current value meets a pre-defined sharing accuracy. In one embodiment, the IPMM module may estimate whether the current sharing parameters of a PSU meet the current sharing accuracy requirement by comparing one or more current sharing measurement values to stored IPMM register values. If the output current does meet the pre-defined sharing accuracy, then the process returns to block 612 and the IPMM module continues to monitor the output current of the PSUs. If the output current does not meet the pre-defined current sharing accuracy, then the IPMM module sends a signal to the PSU to command the PSU with the lowest current output to adjust a voltage value corresponding to sharing accuracy (e.g., to match a value stored in IPMM register6), as depicted in block 616, and then the process returns to block 606. In an embodiment, an IPMM module coupled to a multi-power supply system may keep one PSU output voltage the same if the PSU has higher current, while increasing the PSU output voltage of a different PSU that has lower current. For example, if the current sharing accuracy is not within plus or minus 2%, then the IPMM module may add a PSU having a lowest current with a slight output increment by register6.

Figure 7:
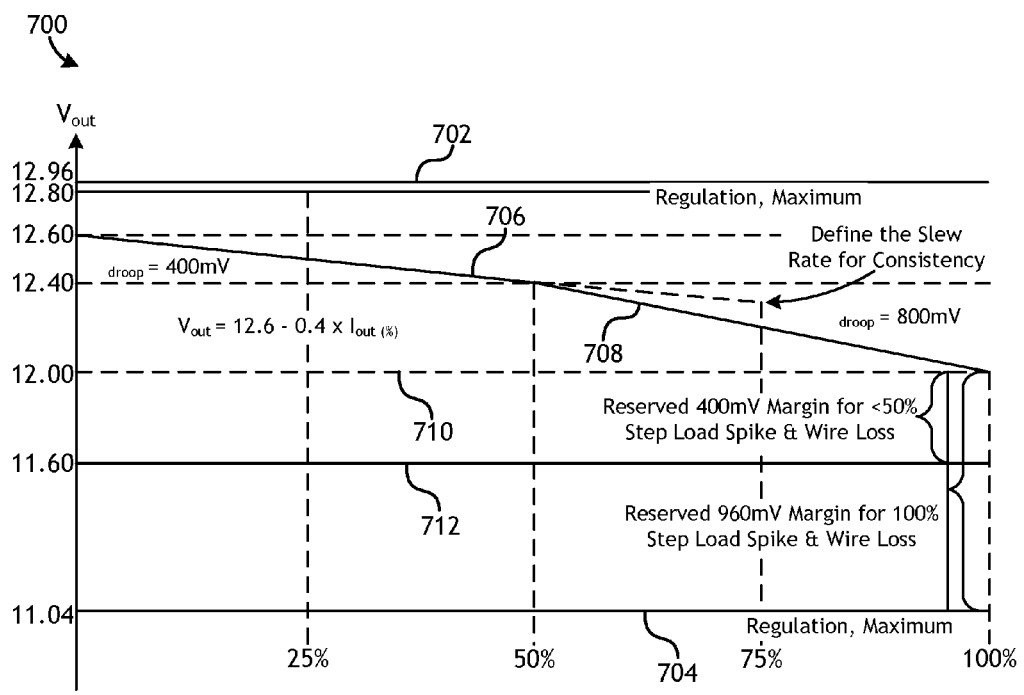
FIG. 7 is a schematic graph illustrating one embodiment of an apparatus for PSU current sharing.

FIG. 7 is a schematic graph 700 illustrating one embodiment of an apparatus for PSU current sharing. In an embodiment, graph 700 may include a first regulation/maximum voltage value line 702, a second regulation/maximum voltage value line 704, a 12 Volt line 710, and a reserved 400 mV margin line 712 that corresponds to a less than 50% step load spike and wire loss in a power supply system. In one embodiment, a plotted line of the output voltage of a power supply system may include a first droop voltage region 706 corresponding to droop voltage of 400 mV and a second droop voltage region 708 corresponding to a droop voltage of 800 mV. In an embodiment, the plotted line of the output voltage may correspond to the equation: $V_{out} = V_{default} - V_{droop} * I_{out}\% = V_{default@0\%} - V_{droop@0\text{-}50\%} * I_{out}\% = 12.6$ volts$-0.4V * I_{out}\%$ for load from 0~50% and $V_{out} = V_{default@50\%} - V_{droop@50\text{-}100\%} * I_{out}\% = 12.4$ volts$-0.8V * I_{out}\%$ for load from 50%~100%, where $I_{out}\%$ is equal to percentage of $$\frac{I_{out}}{I_{full\text{-}load}}.$$

In one embodiment, the output voltage may correspond to the equation: $V_{out} = (V_{default} - V_{droop} * I_{out}\%) = (V_{default} - V_{register3\&4} * I_{out}\%)$, where register 3 may correspond to a first droop voltage setting value (e.g., for between 0% and 50% loading) and register 4 may correspond to a second droop voltage setting value (e.g., for between 50% and 100% loading). In another embodiment, the output voltage may correspond to the equation: $V_{out} = ((V_{default} + V_{register6}) - (V_{droop} * I_{out}\%) - (V_{register5} * I_{out}\%))$, where register 6 may include an IPMM module setting value for an output voltage and register 5 may include an IPMM module setting value for a system distribution resistance, where Vregister5 is equal to impedance information stored in register5 times full of output current, its equation is $V_{register5} = R_{register5} * I_{full\text{-}load}$. In yet another embodiment, the output voltage may correspond to the equation: $V_{out} = ((V_{default} + V_{register6}) - (V_{droop} - V_{register5}) * I_{out}\%)$. An IPMM module may thus utilize values stored in registers and communicated to one or more power supply units coupled to the IPMM to adjust one or more performance attributes of the one or more power supply units and thereby selectively optimize the current sharing performance of the multi-power supply system. The present invention thus provides an accurate method and system for current sharing optimization in a multi-power supply system via a control module that is less complex and more cost effective than conventional active or passive systems.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for power supply unit current sharing, comprising:
    monitoring, with an In-System Power Monitoring and Management (IPMM) module, an output value of a first power supply unit in a multi-power supply system;
    monitoring, with the IPMM module, an output value of a second power supply unit in the multi-power supply system;
    determining, with the IPMM module, an output performance parameter for the multi-power supply system; and
    adjusting, with the IPMM module, a setting of at least one of the first power supply unit and the second power supply unit, and
    wherein the output value of the first power supply unit comprises a first output current of the first power supply unit,
    wherein the output value of the second power supply unit comprises a second output current of the second power supply unit, and
    wherein the step of adjusting comprises:
        determining whether the first output current exceeds a first threshold percentage of a full system loading;
        setting a droop voltage of the first power supply unit to a level specified based, at least in part, on a value associated with whether the output current of the first power supply unit exceeds the first threshold percentage of a full system loading;
        determining whether the second output current exceeds a second threshold percentage of a full system loading; and
        setting a droop voltage of the second power supply unit to a level specified by a value associated with whether the output current of the second power supply unit exceeds the second threshold percentage of a full system loading.

2. The method of claim 1, wherein:
    the output performance parameter is a current sharing value; and
    the adjusting is performed, based on the output value of the first power supply unit, the output value of the second power supply unit, and the output performance parameter, to bring a current sharing performance parameter of the multi-power system into a range specified by the current sharing value.

3. The method of claim 1, wherein the output performance parameter is a current sharing error margin of a full power load.

4. The method of claim 1, wherein the setting comprises a distribution impedance value of at least one of the first power supply unit and the second power supply unit.

5. The method of claim 1, wherein the setting is a droop voltage value.

6. The method of claim 1, wherein the setting comprises a set voltage increment value of at least one of the first power supply unit and the second power supply unit.

7. The method of claim 1, wherein the step of adjusting further comprises:
   determining whether a current sharing performance parameter of the multi-power supply system meets a pre-defined sharing accuracy specified by the output performance parameter;
   determining which one of the first power supply unit and the second power supply unit has a lower current output; and
   adjusting a voltage of the determined one of the first power supply unit and the second power supply unit with the lower current output to meet a voltage value corresponding to the sharing accuracy specified by the output performance parameter.

8. A system for power supply unit current sharing, comprising:
   a first power supply unit in a multi-power supply system;
   a second power supply unit in the multi-power supply system; and
   an In-System Power Monitoring and Management (IPMM) module configured to:
      monitor an output value of the first power supply unit;
      monitor an output value of the second power supply unit;
      determine an output performance parameter for the multi-power supply system; and
      adjust a setting of at least one of the first power supply unit and the second power supply unit,
   wherein the output value of the first power supply unit comprises a first output current of the first power supply unit,
   wherein the output value of the second power supply unit comprises a second output current of the second power supply unit; and
   wherein the In-System Power Monitoring and Management (IPMM) module is configured to adjust the setting by performing steps comprising:
      determining whether the first output current exceeds a first threshold percentage of a full system loading;
      setting a droop voltage of the first power supply unit to a level specified by a value associated with whether the output current of the first power supply unit exceeds the first threshold percentage of a full system loading;
      determining whether the second output current exceeds a second threshold percentage of a full system loading; and
      setting a droop voltage of the second power supply unit to a level specified by a value associated with whether the output current of the second power supply unit exceeds the second threshold percentage of a full system loading.

9. The system of claim 8, wherein:
   the output performance parameter is a current sharing value; and
   the adjusting is performed, based on the output value of the first power supply unit, the output value of the second power supply unit, and the output performance parameter, to bring a current sharing performance parameter of the multi-power system into a range specified by the current sharing value.

10. The system of claim 8, wherein the output performance parameter is a current sharing error margin of a full power load.

11. The system of claim 8, wherein the setting comprises a distribution impedance value of at least one of the first power supply unit and the second power supply unit.

12. The system of claim 8, wherein the setting is a droop voltage value.

13. The system of claim 8, wherein the setting comprises a set voltage increment value of at least one of the first power supply unit and the second power supply unit.

14. The apparatus of claim 8, wherein the step of adjusting further comprises:
   determining whether a current sharing performance parameter of the multi-power supply system meets a pre-defined sharing accuracy specified by the output performance parameter;
   determining which one of the first power supply unit and the second power supply unit has a lower current output; and
   adjusting a voltage of the determined one of the first power supply unit and the second power supply unit with the lower current output to meet a voltage value corresponding to the sharing accuracy specified by the output performance parameter.

15. An apparatus for power supply unit current sharing, comprising:
   a first power supply unit in a multi-power supply system;
   a second power supply unit in the multi-power supply system; and
   an In-System Power Monitoring and Management (IPMM) module configured to:
      monitor an output value of the first power supply unit;
      monitor an output value of the second power supply unit;
      determine an output performance parameter for the multi-power supply system; and
      adjust a setting of at least one of the first power supply unit and the second power supply unit,
   wherein the output value of the first power supply unit comprises a first output current of the first power supply unit,
   wherein the output value of the second power supply unit comprises a second output current of the second power supply unit; and
   wherein the In-System Power Monitoring and Management (IPMM) module is configured to adjust the setting by performing steps comprising:
      determining whether the first output current exceeds a first threshold percentage of a full system loading;
      setting a droop voltage of the first power supply unit to a level specified by a value associated with whether the output current of the first power supply unit exceeds the first threshold percentage of a full system loading;
      determining whether the second output current exceeds a second threshold percentage of a full system loading; and setting a droop voltage of the second power supply unit to a level specified by a value associated with whether the output current of the second power supply unit exceeds the second threshold percentage of a full system loading.

16. The apparatus of claim 15, wherein:

the output performance parameter is a current sharing value; and the adjusting is performed, based on the output value of the first power supply unit, the output value of the second power supply unit, and the output performance parameter, to bring a current sharing performance parameter of the multi-power system into a range specified by the current sharing value.

17. The apparatus of claim 15, wherein the output performance parameter is a current sharing error margin of a full power load.

18. The apparatus of claim 15, wherein the setting comprises a distribution impedance value of at least one of the first power supply unit and the second power supply unit.

19. The apparatus of claim 15, wherein the setting is a droop voltage value.

20. The apparatus of claim 15, wherein the setting comprises a set voltage increment value of at least one of the first power supply unit and the second power supply unit.

* * * * *